Patented May 7, 1929.

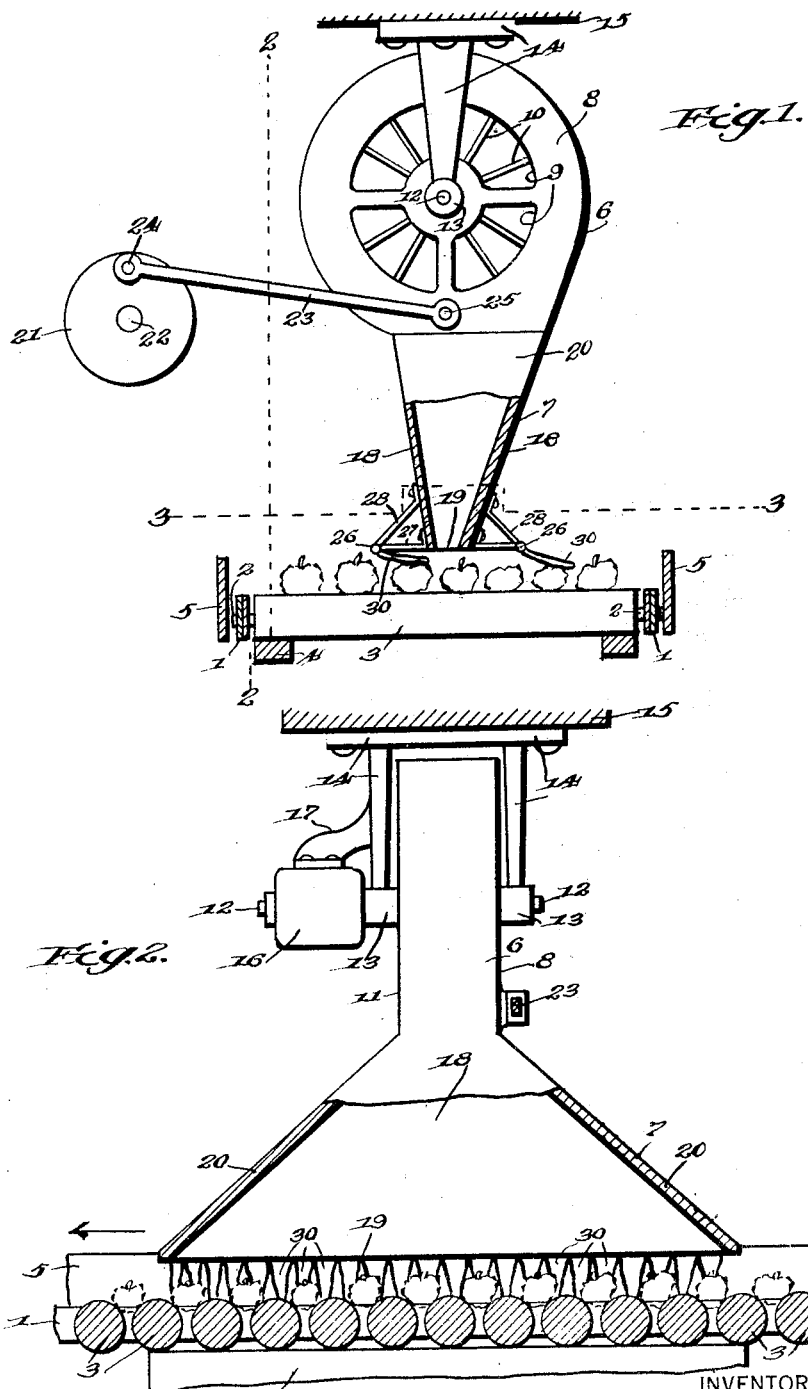

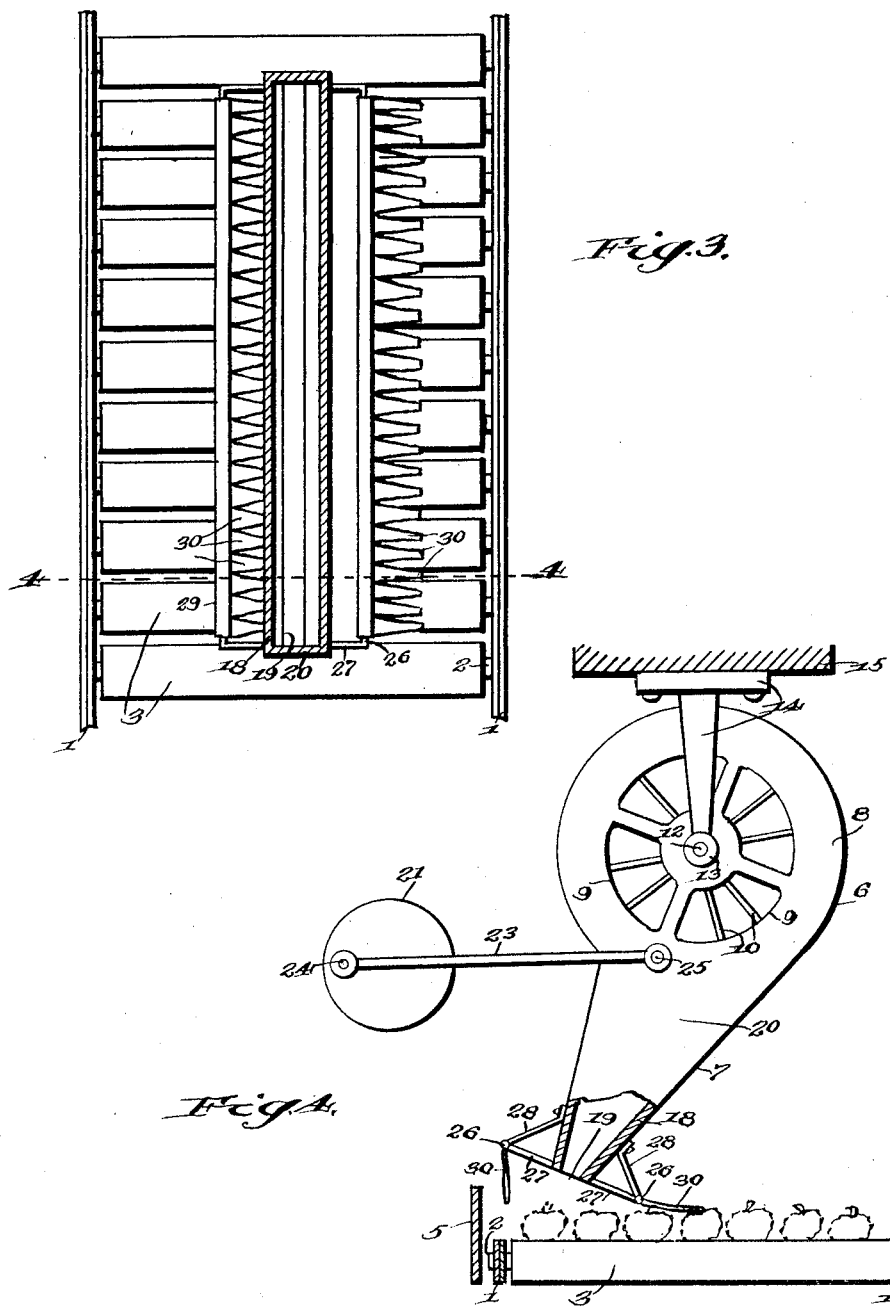

1,711,763

UNITED STATES PATENT OFFICE.

EDWARD A. WHITE, OF LEWISTON, IDAHO.

FRUIT-DRYING APPARATUS.

Application filed August 6, 1928. Serial No. 297,605.

The object of this invention is to provide a novel means for drying whole wet fruit and the invention is an improvement on the apparatus disclosed in my patent for improvement in fruit drying machine and method, issued Nov. 13, 1928, No. 1,691,874.

This invention has to do with a novel drying device and method in which air is made to traverse the periphery of the fruit at such an intensive velocity that the water or liquid will be blown off the fruit rather than evaporated therefrom.

A feature of the invention consists in applying the air in such a manner that the drying or blow off capacity is greatly increased as compared to prior devices.

In this connection, it is a feature of my invention to provide an elongated nozzle to increase the range of the device, and it is also a feature to shift or oscillate the nozzle in a manner to further extend the capacity of the device, the elongation of the nozzle affording increase of capacity in one direction with respect to the fruit, and the shifting or oscillation of the nozzle affording increased capacity in another direction with respect to the fruit.

It is a feature of the invention to advance the fruit in an orderly or predetermined manner, as for instance, in rows, and to apply the air to the rows in such a manner as not only to blow off the water or other liquid, but to slightly rock or roll the fruit entities thus engaged so as to expose greater areas thereof to the air.

It is a further feature of the invention to provide means for gliding or wiping engagement with the fruit not for the purpose of drying the latter but for the primary purpose of disrupting or attenuating a globule of water or liquid to thereby facilitate the action of blowing off the latter.

The invention has many other features and objects which will be more fully described in connection with the accompanying drawings and which will be more particularly pointed out in and by the appended claims.

In the drawings:

Fig. 1, is a view partly in elevation and partly in section.

Fig. 2, is a view partly in elevation and partly in section and taken on line 2—2 of Fig. 3.

Fig. 3, is a sectional view on line 3—3 of Fig. 1.

Fig. 4, is a sectional view on line 4—4 of Fig. 3, with most of the blower in elevation.

Like characters of reference designate similar parts throughout the different figures of the drawings.

Referring to the specific form shown, I have illustrated a carrier for the wet fruit which may consist of an endless belt composed of suitable side chains 1 in which the pintles 2 of rollers 3, may be journalled and supported. The rollers 3 may or not be rotatably mounted in the chains 2 and said rollers will be suitably spaced apart so that the fruit entities will seat between adjacent rollers, as shown. Thus, the fruit will be advanced in an orderly manner which, in the present construction, would be in the form of rows disposed at right angles to the line of travel, which is indicated by the arrow shown in Fig. 2. If the rollers 3, are rotatably mounted, and if it is desired that the rollers be rotated, then, those rollers 3 which are passing through the air, may ride on a track 4, although this is not essential. A suitable feed is, in practice, provided at the right hand end of the carrier, viewing Fig. 2, and not shown, and the fruit entities will be in slightly irregularly spaced relation from each other, or some will be in actual contact, although the entities will, in the present construction, invariably be in rows. Further, the rate of travel will be comparatively slow, and if desired, the carrier may be equipped with side boards, as indicated at 5.

It will now be clear that the carrier is of such construction that air will readily pass therethrough and the rollers will always present convex surfaces to the blast thereby greatly facilitating the action of the latter in maintaining the rollers comparatively free from water.

I will next describe that feature of my invention for removing from the fruit, the water or other liquid which remains on the surface subsequent to rinsing.

As shown, a blower structure is employed and the same includes what I will term the fan casing or section and which I will designate at 6, and a nozzle section which I will generally designate at 7, and both of which will presently be more specifically described.

The intake side 8, of the fan section 6 is provided with a series of openings 9 for ingress of air, and through these openings I have generally indicated the fan blades 10. In this connection, it may be informative to state that I employ a fan of a very powerful construction, and preferably although not necessarily, of the "Sirocco" type, as for instance in the disclosure made in U. S. patents to Davidson, Reissue, Nos. 12,796 and 12,797.

The remaining side 11, of the fan section 6, may be closed and the fan shaft 12, as shown, is journalled in pendant bearings 13 which are hung from a bracket 14, suitably anchored at 15. I have shown an electric motor 16, mounted on a bracket 17, and the armature of which is direct on shaft 12 so as to afford a direct drive. It will thus be seen that this construction greatly facilitates the rocking or oscillating movement of the structure in a manner to be later described since the rocking motion is about the same axis as the fan rotates about. It will also be noted that the plane of the section 6, is disposed lengthwise of the rollers 3, and transversely to the direction of movement of the carrier.

I will next describe the nozzle section of the blower structure.

The nozzle section 7, joins the fan section 6, in a manner that will be clearly seen from Figs. 1 and 2, and the fan will rotate in a clockwise direction, viewing Fig. 1, so that the stream of air will not encounter any abrupt resistance in passing from the fan section 6 to the nozzle section 7. Said nozzle section 7 converges, as regards walls 18, from the juncture with the fan section 6, to the relatively narrow discharge or nozzle opening 19. The walls 20, of said nozzle section diverge, as shown in Fig. 2, to form an elongated nozzle, the elongation being in the direction of travel of the carrier, as will be seen from Figs. 1 and 2. However, the width of the opening 19, is the same as shown in Fig. 1, throughout the length of said opening. Thus, the plane of the nozzle section 7, is substantially at right angles to the plane of the fan section 6.

It will now be clear that while there is a restriction at the nozzle opening 19, which is uniform throughout the length thereof, there is no appreciable restriction above this opening and there is absolutely no abrupt abutment or resistance of any kind, that can interfere with passage of the air from the fan section 6 to the nozzle opening 19, aside from such skin friction as would be presented by the passage of any gaseous body through an enclosed conduit.

It is because of the absence of abrupt resistance that I am able to apply air in the desired velocity to actually blow off the liquid from the surface of the fruit, and when I define an abrupt resistance, I include therein an actual rectangular turn in a conduit.

Before further developing this phase of the invention, I will next describe the means whereby the air blast is shifted to engage a swath of fruit of considerable width.

I have shown a crank disc 21 mounted on a shaft 22 which will be driven at the desired rate of speed. A connecting rod 23, is connected at 24, with said crank, and at 25, with said blower structure. Thus, as the crank disc revolves, the nozzle will be oscillated in such a manner and at a sufficient sweep to apply the air blast to the full swath of fruit entities being advanced by the carrier. Further, the application of the blast will be uniform to all the fruit entities.

It will now be clear that I have not only solved the problem of delivering a blast of air to an elongated area lengthwise of the carrier, but I have also solved the problem of shifting such air blast laterally to act on the full width of swath of fruit being advanced.

By reason of the fact that the nozzle shifts laterally and lengthwise of the rows of fruit, it will be clear that the blast will impart to the entities of the latter a rocking or rolling action that will serve to present or expose additional areas of the fruit entities to the action of the blast, as compared with a nozzle that shifted lengthwise of the carrier.

As a means of facilitating the blowing off action of the air blast, I may employ brackets each comprising a rod 26, with suitable rod arms 27 and 28, anchored to the walls 18, near the nozzle opening 19. To the rods 26 are attached wiping curtains 29, that may be slit to form stringers 30. These stringers trail over the fruit entities as the nozzle is shifted, not primarily for the purpose of drying the fruit, but to disrupt globules of liquid on the surface of the fruit and to reduce such globules to attenuated form such as would facilitate the blast in blowing the same off from the fruit.

While I do not regard these stringers as an essential feature to the operation of my device, I do consider that in some conditions, they will hasten the action of the blower.

It will be clear that I deliver an elongated blast longitudinally of the swath of advancing fruit that is so narrow as only to normally engage a limited width of the swath, and that I provide means for causing said elongated blast to engage all the entities of the swath for the full width thereof.

It is a feature of the invention to contract the discharge opening 19, sufficient with respect to the area of the nozzle section above said opening and below the fan section, as to afford a force pump action, and thereby enabling me to obtain a more effective sustained air blast discharge. Thus, the area above opening 19, and below the fan section, may be considered a reservoir section or chamber in which the air is accumulated under pressure more rapidly than it can egress from openings 19.

It is believed that the invention will be fully understood from the foregoing description, and while I have herein shown and described one specific form of my invention, I do not wish to be limited thereto except for such limitations as the claims may import.

I claim:

1. In a fruit drying apparatus, a carrier for continuously advancing the wet fruit to be dried, and means continuously movable within range of the wet fruit for directing a blast air passage about the latter to blow off liquid from the fruit as the latter is being advanced into and through the range of said means.

2. In a fruit drying apparatus, a carrier for advancing a plurality of wet fruit entities along a swath of travel, means for directing a sustained blast of air onto said fruit entities of sufficent force to blow off the liquid therefrom, and mechanism for continuously moving said means to apply said air blast to the entire swath of advancing entities as the latter are advanced through said blast.

3. In a fruit drying apparatus, a carrier for advancing wet fruit through a swath of travel, a blower having a nozzle for directing an air blast onto a portion of the wet fruit, and mechanism for continuously moving said nozzle to apply the air blast to all of the wet fruit within the range of said nozzle.

4. In a fruit drying apparatus, a carrier for advancing wet fruit through a travel swath, a blower structure having a fan casing and a nozzle, and mechanism for continuously moving said structure to cause said nozzle to direct an air blast to all of the wet fruit of said swath within the range of said nozzle.

5. In a fruit drying apparatus, a carrier for advancing wet fruit through a travel swath, a blower structure having a fan casing and a nozzle and the latter having an elongated nozzle opening, and mechanism for continuously moving said structure to cause said elongated nozzle opening to direct an air blast to all of the wet fruit of said travel swath within the range of said nozzle.

6. In a fruit drying apparatus, a carrier for advancing the wet fruit through a travel swath of a substantially uniform width, a blower structure having a fan casing and a nozzle and said nozzle having a narrow discharge opening elongated in the direction of travel of said wet fruit to direct an air blast longitudinally of said swath, and mechanism for continuously shifting said nozzle laterally of said swath to substantially uniformly direct said air blast to all the wet fruit as the latter advances within the range of said blast.

7. In a fruit drying apparatus, a carrier for advancing wet fruit in rows disposed substantially transversely of the line of travel thereof, a blower having a nozzle provided with a discharge opening elongated in the direction of travel of said fruit, and mechanism for oscillating said nozzle along said rows, whereby the discharging blast will rock or roll the fruit transversely of the line of travel to expose additional areas of the fruit to said air blast.

8. In a fruit drying apparatus, a carrier for advancing wet fruit, a blower structure having a fan and a fan casing or section disposed transversely of the line of travel of said carrier and said structure having an elongated nozzle disposed in the line of travel of said carrier to discharge air lengthwise thereof, and means for continuously oscillating said structure about the axis of rotation of said fan and causing said nozzle to direct said air blast transversely of said carrier.

9. In a fruit drying apparatus, a carrier for advancing a swath of wet fruit entities, an air blast mechanism elongated in the direction of travel of the carrier and sufficiently narrow to direct a blast against only a limited number of fruit entities in said swath, and means for causing said blast to engage all the entities of said swath.

10. In a fruit drying apparatus, means for advancing wet fruit, means for moving an air blast mechanism to discharge a blast of air on all the wet fruit, and means for imparting a wiping action to the fruit while the latter is in the range of said blast.

11. In a fruit drying apparatus, conveyor means for advancing wet fruit, and rotating the same, and air blast means continuously movable abreast of the wet fruit and imparting to the latter a movement of a character different from the movement imparted by said conveyor means.

In witness whereof, I hereby affix my signature.

EDWARD A. WHITE.